US006907598B2

(12) United States Patent
Fraser (10) Patent No.: US 6,907,598 B2
(45) Date of Patent: Jun. 14, 2005

(54) METHOD AND SYSTEM FOR COMPRESSING PROGRAM CODE AND INTERPRETING COMPRESSED PROGRAM CODE

(75) Inventor: Christopher Warwick Fraser, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 561 days.

(21) Appl. No.: 10/164,032

(22) Filed: Jun. 5, 2002

(65) Prior Publication Data

US 2003/0229709 A1 Dec. 11, 2003

(51) Int. Cl.[7] .................................................. G06F 9/44
(52) U.S. Cl. ....................... 717/127; 717/136; 717/139; 717/140; 718/1; 712/208; 712/245
(58) Field of Search .................................. 717/127, 131, 717/136, 139, 140, 107; 382/232, 233; 718/1; 712/208, 245

(56) References Cited

U.S. PATENT DOCUMENTS

| | | | | | |
|---|---|---|---|---|---|
| 5,881,290 | A | * | 3/1999 | Ansari et al. | 717/136 |
| 6,151,618 | A | * | 11/2000 | Wahbe et al. | 718/1 |
| 6,263,429 | B1 | * | 7/2001 | Siska | 712/245 |
| 6,301,394 | B1 | * | 10/2001 | Trout | 382/244 |
| 6,317,867 | B1 | | 11/2001 | Elnozahy | 717/107 |
| 6,345,357 | B1 | | 2/2002 | Sato | 712/241 |
| 6,388,585 | B1 | * | 5/2002 | Lacerda | 341/51 |
| 6,618,506 | B1 | * | 9/2003 | Auerbach et al. | 382/232 |
| 6,658,151 | B2 | * | 12/2003 | Lee et al. | 382/229 |
| 6,691,305 | B1 | * | 2/2004 | Henkel et al. | 717/136 |
| 6,732,256 | B2 | * | 5/2004 | Henkel et al. | 712/208 |

OTHER PUBLICATIONS

Title: Bytecode Compression via Profiled Grammer Rewriting, author: Evans et al, ACM, 2001.*
Title: Data Compression with Finite Windows, author: Fiala et al, ACM, 1989.*
"A Text–Compression–Based Method for Code Size Minimization in Embedded Systems," by Stan Liao, Srinivas Devadas, and Kurt Keutzer, ACM Transactions on Design Automation of Electronic Systems, vol. 4, No. 1, Jan. 1999, pp. 12–38.
"Microsoft P–Code Technology," by Andy Padawer, Code Generator Manager, Microsoft Development Tools Division, Apr. 1992.

* cited by examiner

Primary Examiner—Chameli C. Das
(74) Attorney, Agent, or Firm—Merchant & Gould P.C.

(57) ABSTRACT

A computer system and method for compressing an instruction stream and executing the compressed instruction stream without decompression. The invention utilizes a new pointer instruction, i.e., an "Echo" instruction that is used to replace repeated instructions or sequences of instructions, also referred to as phrases. Replacing subsequent, repeated phrases with the Echo instruction reduces the size of the instruction stream, i.e., compresses the instruction stream. The Echo instruction generally identifies at least one literal instruction appearing before the Echo instruction and further identifies the number of instructions appearing before the Echo instruction to be repeated. No additional delimiters are necessary, e.g., no End Echo instructions are required. Omitting the End Echo instruction allows for overlapping phrases without the need for two Echo instructions. Reducing the number of instructions used significantly increases compression.

36 Claims, 7 Drawing Sheets

METHOD AND SYSTEM FOR COMPRESSING PROGRAM CODE AND INTERPRETING COMPRESSED PROGRAM CODE

FIELD OF THE INVENTION

The present invention relates to the compression of computer data readable by a computer system, and in particular methods of compressing executable or interpretable program code and to methods of directly interpreting such compressed program code.

BACKGROUND OF THE INVENTION

Typical embedded systems, such as handheld computer systems, telephones, etc., provide computing functionality to a user while consuming a relatively small amount of space. Indeed, most embedded systems have relatively strict space requirements, which include a limitation on memory space. Consequently, program code designed to operate on such embedded systems is preferably optimized in one form or another to reduce the size of that code, such that the amount of memory consumed by storing the code on the embedded system is reduced.

A known method or system of reducing memory consumption of executable code relates to the use of byte-code interpreters. That is, systems have been designed to compile high-level computer programs into an intermediate level program, sometimes referred to as a byte code, which may be "executed" by a byte-code interpreter. Other systems may use another term, such as "p-code" instead of "byte code". The resulting byte code is relatively smaller in size than the more traditional machine language executable form of a computer program, such that storing the byte code consumes less memory. Further, the interpreter is merely another computer program designed to receive byte code and directly execute the byte code without further compilation. The resulting combination of the interpreter and byte-code programs generally consumes significantly less memory space than compiled machine code.

Although the byte code/interpreter combination is useful in conserving memory consumption, additional efforts have been made to further reduce the size of the resulting byte code. Indeed, even with the use of interpreter, as programs grow in functionality and complexity, the interpretable byte code still consumes a significant amount of space. One method of reducing memory consumption relates to compressing the existing code. Compressing program code generally reduces the amount of memory consumed by the code itself without modifying the functional characteristics of the code that are noticeable to the user. When compressed code is executed, since some accommodations may need to be made for the compressed code, performance may be relatively slower than execution of uncompressed code. However, this tradeoff is often an acceptable drawback since the reduction in performance may be minimal in comparison to the highly desired reduction in memory consumption.

One compression technique relates to dictionary-based code compressors that associate a new code instruction with a common sequence or "phrase" of command instructions in either the original program or in a generic cross-section of known programs. The new instruction is created to replace the sequence of commands. Typically, the known sequence of commands is still stored in memory, i.e., in a dictionary, and this sequence is called during execution of the new, replacement instruction. Memory is conserved in that the new code instruction, taking the space of only one instruction, may be used to replace each occurrence of the sequence of commands, while storing the sequence of commands only once. However, since the sequence(s) must be stored in a persistent manner, dictionary-based compression algorithms still consume a significant amount of memory. Moreover, special arrangements must be made for the additional dictionary memory, including recognition of the dictionary address, among others.

Another solution relates to the use of a "Quote/EndQuote" command combination. Essentially, during the compression phase, the byte code is analyzed for repeating sequences, and instead of putting the sequences in a dictionary, the first sequence or phrase is stored in the program memory in a relatively normal manner. However, an "EndQuote" command or instruction is inserted at the end of the phrase. The EndQuote command acts as a delimiter for the repeated phrase. Also a "Quote" command is inserted in place of the next and subsequent phrases that repeat this earlier phrase. The Quote has a pointer which points to the beginning of the phrase earlier in the program memory thereby compressing the byte code. Later, during interpretation, each time a Quote command is encountered, the interpreter jumps to the beginning of the sequence and begins interpreting/executing the commands in the repeated phrase. This process continues until the interpreter reaches an End Quote command, which causes the program flow to jump back to the next byte code instruction, i.e., the one immediately following the Quote instruction.

The Quote/EndQuote combination overcomes some of the problems associated with the dictionary-based methods since the sequence is stored in a place where it was needed anyway and uses the same memory and address space as the rest of the program code. Unfortunately however, the Quote/EndQuote system has some drawbacks. For instance, two commands must be used, i.e., a Quote and an EndQuote command, for each sequence. Furthermore, if a portion of one repeated phrase overlaps with another repeated phrase, then two Quote commands must be used to compress one of the phrases. For example, assuming instructions 111 through 123 are repeated numerous times such that the phrase is marked with an EndQuote delimiter. Additionally, assume that instructions 115 through 129 are also repeated numerous times such that the phrase is also marked with an EndQuote delimiter. Using the Quote/EndQuote method, in order to Quote the second phrase, a first Quote instruction must be used to process instructions 115 to 123 and a second Quote instruction must be used to process the remaining instructions through to instruction 129. The reason why a second Quote instruction is needed is because of the EndQuote delimiter that is encountered immediately following instruction 123 which ends the execution of the phrase and causes flow to jump back to the instruction immediately following the first Quote instruction.

Another issue with respect to the Quote/EndQuote method relates to the fact that the known systems do not support nesting of repeated phrases. The nesting of phrases relates to Quoting a phrase that contains another Quote instruction within the repeated phrase. In known systems, the process operates in a manner that simply stores the program counter value in a register once a Quote instruction is encountered. The register is then checked upon reaching an EndQuote instruction. If the register holds a value stored by a Quote instruction, then the processor copies the register into the program counter and clears the register; flow continues after the original Quote instruction. If the register has no value stored therein, such as the first time the phrase is interpreted, then flow simply proceeds to the next instruction immediately following the EndQuote instruction. Using this approach, only one Quote instruction can be implemented as multiple return values cannot be stored.

It is with respect to these and other considerations that the present invention has been made.

SUMMARY OF THE INVENTION

The present invention relates to a computer system and method for compressing an instruction stream and executing the compressed instruction stream without decompression. The invention utilizes a new pointer instruction, i.e., an "Echo" instruction that is used to replace repeated addressable units, instructions or sets of instructions, also referred to as "phrases". Replacing subsequent, repeated phrases with the Echo instruction reduces the size of the instruction stream, i.e. compresses the instruction stream. The Echo instruction generally identifies at least one literal instruction appearing before the Echo instruction and further identifies the number of instructions appearing before the Echo instruction to be repeated. In order to identify both the beginning and the end, the Echo instruction has two fields or parameters, a displacement parameter and a length or count parameter. The displacement refers to the beginning of the repeated phrase and the length provides a means of determining the end of the phrase. By providing a length parameter, no additional delimiters are necessary, e.g., no End Echo instructions are required. Omitting the End Echo instruction allows for overlapping phrases without the need for two Echo instructions. Reducing the number of instructions used significantly increases compression.

The present invention also relates to an interpreter or execution engine that is able to interpret the Echo instruction directly such that no decompression is necessary. The Echo instruction points back to the previously executed instruction phrase such that the interpreter merely manipulates the program counter, during execution of the instruction stream, to re-execute the phrase of instructions. The program counter is then restored so control flow resumes immediately following the Echo instruction. In an embodiment the present invention pushes the return address or value on a stack so that the Echo commands can be nested.

In accordance with certain aspects, the present invention relates to a method of compressing an instruction stream of non-Echo or "literal" instructions, the method comprising acts relating to sequentially analyzing the stream of instructions; determining that one or more phrases are repeated; and replacing at least one instance of the one or more repeated phrases with an Echo instruction to build a compressed instruction stream. The Echo instruction has both a displacement value to identify the beginning of the phrase and a length value indicating the end of the phrase. In an embodiment, the resulting compressed instruction stream is directly interpretable without decompression.

The method further includes encoding the instruction stream to provide means of differentiation between the literal instructions and the Echo instructions. In an embodiment, upon determining that a phrase is repeated, the method determines the memory address of the previous occurrence of the phrase, typically using a displacement value relating to the distance between the first occurrence of the phrase and the second occurrence of the phrase and determines a length value relating to the number of instructions in the repeated phrase; and wherein the act of encoding also encodes the displacement and length values into the Echo instruction, wherein the Echo instruction replaces the second occurrence of the phrase. In other embodiments, the method may, upon determining that a phrase is repeated, determine to not replace a particular repeated phrase based on predetermined characteristics.

In accordance with other aspects, the present invention relates to a system for executing a compressed stream of instructions, wherein the stream of instructions is stored in a program store. The instruction stream has both literal instructions and one or more Echo instructions, wherein each Echo instruction relates to one or more literal instructions located in the program store. The system has an execution module that executes literal instructions in the instruction stream; an evaluation module that determines whether an instruction is a literal instruction or an Echo instruction; and an Echo module for executing the one or more Echo instructions. The system may also involve a program counter used to identify instructions within the program store, wherein the Echo module has a program counter control module, the program counter control module controlling the value of the program counter, wherein the value of the program counter identifies the next instruction to be executed by the computer system. The Echo module may also have a count module for maintaining a count of instructions to be repeated during execution of the one or more Echo instructions. In one embodiment, the program control module stores the present value of the program counter upon execution of an Echo instruction and modifies the value of the program counter to identify a previously executed instruction in the program store and then restores the stored value of the program counter upon completion of the Echo instruction.

In accordance with yet other aspects, the present invention relates to a method of executing a compressed instruction stream, the compressed instruction stream having one or more literal instructions and one or more Echo instructions. The method sequentially evaluates one of the instructions in the instruction stream to determine whether each instruction is one of the literal instructions or one of the Echo instructions. Upon determining that an evaluated instruction is one of the literal instructions, the method executes the literal instruction. On the other hand, upon determining that an instruction is one of the Echo instructions, the method executes one or more previously executed instructions. In an embodiment, the instruction stream is a byte-code. The Echo instructions may have at least two parameters: a first parameter associated with a displacement value, the displacement value indicating a number of intermediate addressable units, or distance, between the Echo instruction and a first instruction in the phrase; and a second parameter associated with a count value related to the number of instructions in the phrase. The act of executing one or more previously executed instructions may further involve saving an original program counter value; modifying the program counter based on the displacement value; and performing one or more instructions identified by the modified program counter. Upon executing one or more instructions identified by the modified program counter, the method may then restore the original program counter value; and execute the instruction immediately following the Echo instruction.

In accordance with other aspects, the present invention relates to a computer-readable medium having stored thereon a data structure, wherein the data structure has a compressed instruction stream of instructions executable by a computer system. In an embodiment, this instruction stream further has one or more literal instructions; one or more Echo instructions; and encoding to differentiate Echo instructions from literal instructions. The instruction stream may be executed without decompression. The data structure may further include Echo instructions having an opcode region indicating the type of operation; a displacement region indicating the location of a repeatable phrase; and a length region indicating the length of the repeatable phrase.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION

Figure 1:
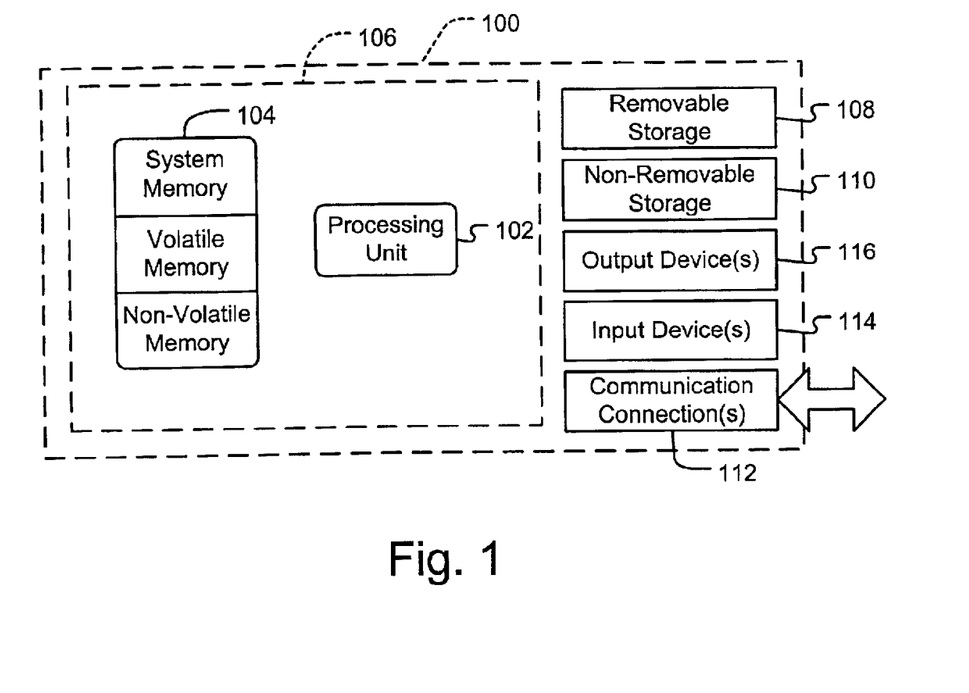
FIG. 1 illustrates a computer system that may be used according to particular aspects of the present invention.

A computer system 100 that may incorporate aspects of the present invention is shown in FIG. 1. The system 100 has at least one processor 102 and a memory 104. In one embodiment the processor 102 compresses a portion of uncompressed program code according to other aspects of the present invention. In another embodiment of the invention, the processor 102 uses memory 104 to store compressed executable program code that has been compressed according to the present invention and later executes or interprets that compressed code. The processor 102 may interpret the compressed code directly without decompressing the compressed code such that space in memory 104 is conserved.

In its most basic configuration, computing system 100 is illustrated in FIG. 1 by dashed line 106 encompassing the processor 102 and the memory 104. Additionally, system 100 may also include additional storage (removable and/or non-removable) including, but not limited to, magnetic or optical disks or tape. Such additional storage is illustrated in FIG. 1 by removable storage 108 and non-removable storage 110. Computer storage media, such as memory 104, removable storage 108 or non-removable storage 110 includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 100. Any such computer storage media may be part of system 100. Depending on the configuration and type of computing device, memory 104 may be volatile, non-volatile or some combination of the two.

System 100 may also contain communications connection(s) 112 that allow the device to communicate with other devices. Additionally, system 100 may have input device(s) 114 such as keyboard, mouse, pen, voice input device, touch input device, etc. Output device(s) 116 such as a display, speakers, printer, etc. may also be included. All these devices are well known in the art and need not be discussed at length here.

Computer system 100 typically includes at least some form of computer readable media. Computer readable media can be any available media that can be accessed by system 100. By way of example, and not limitation, computer readable media may comprise computer storage media and communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 2:
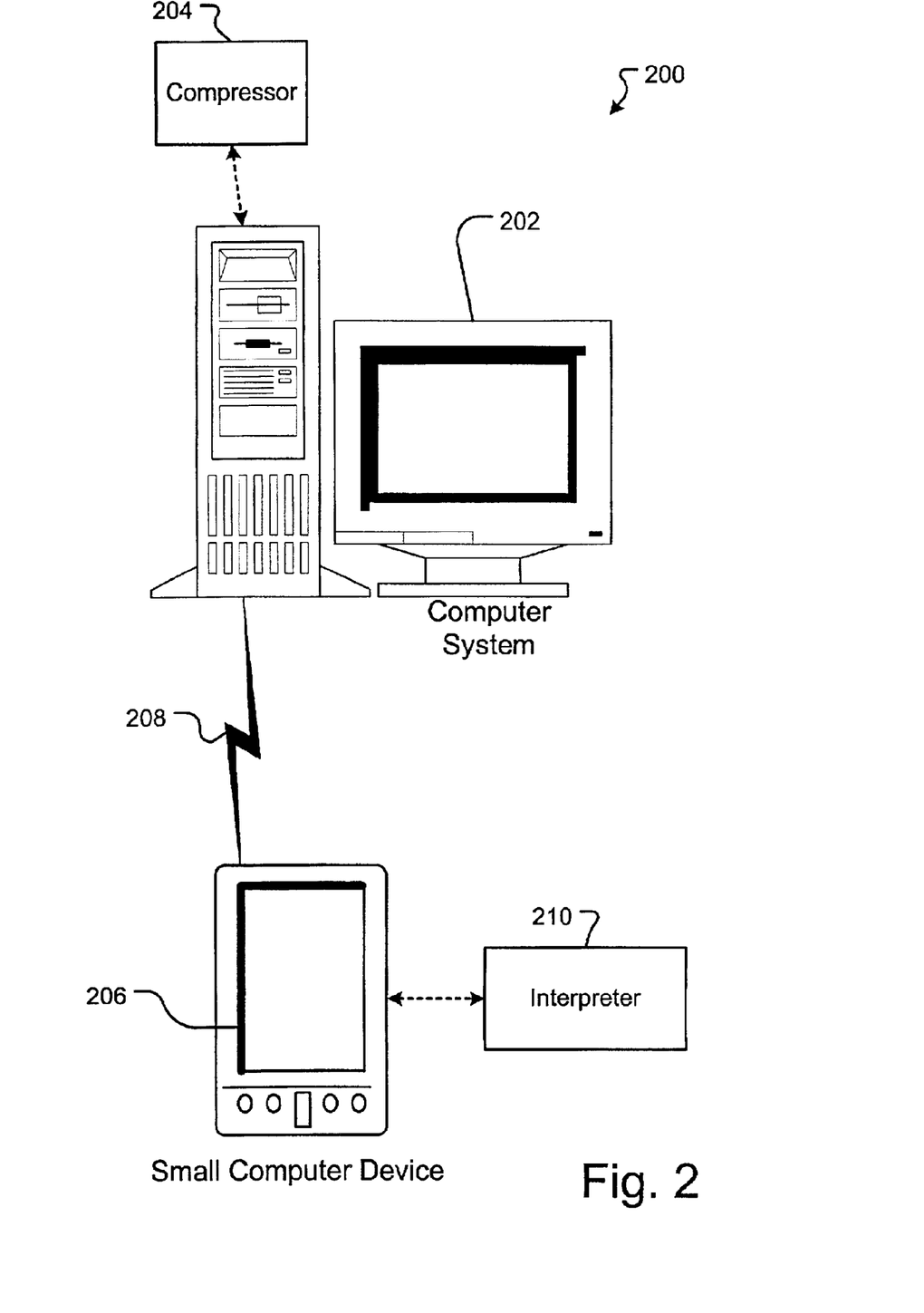
FIG. 2 illustrates a communication or distributed network that incorporates the computer shown in FIG. 1 and incorporates other aspects of the present invention.

A distributed environment 200 incorporating aspects of the present invention is shown in FIG. 2. The environment 200 has at least one computer system 202 that has a compressor module 204 for compressing computer program code. As shown in FIG. 2, the computer system 202 communicates with at least one other computer system such as 206, via communications link 208. In an embodiment of the invention, the computer system 206 is a small computer device such as a handheld computer system, wherein the small computer device has an interpreter module 210. The interpreter module 210 interprets the compressed program code compressed by the compressor module 204 and transmitted to the computer system 206 via link 208. In other embodiments, the computer system 202 may transmit the compressed code to many other computer systems. Similarly, the small computer device 206 may receive compressed code from more than one computer system, such as computer system 202.

In an embodiment, the computer system 202 may be represented by the computer system 100 shown in FIG. 1. In essence, the computer system 202 has at least one processing unit, such as 102 (FIG. 1) and some memory, such as memory 104 (FIG. 1) and a communications connection, such as connection 112 (FIG. 1). The processing unit and memory in computer system 202 are used to compress at least a portion of program code, through the use of compressor module 204. The communications connection is used to transfer the compressed code to the computer system 206. In alternative embodiments, the computer system 202 compresses program code and then interprets the code locally, such that no transmission takes place. In essence, the computer system 202 may perform both functions of compressing program code and interpreting compressed program code. However, such a system typically requires sufficient memory to store uncompressed code and a compressor module such that memory consumption may not be optimized, as compared to the use of the small computer system 206.

As shown in FIG. 2, small computer device 206 receives information from the computer system 202, wherein such information may be compressed program code that has been compressed by the compressor module 204. In accordance with aspects of the present invention, the small computer device 206 may be practically any computer device and thus may be represented by computer system 100 shown in FIG. 1. The one feature generally attributable to the small computer device 206 is that its memory space is limited for one reason or another. Since the small computer device 206 may receive a compressed code, the memory used to store the program code is reduced in comparison to the case where the program code was not compressed. This may be particularly important where the small computer device 206 has limited space requirements, such as where the small computer device is an embedded application specific integrated circuit (ASIC), a telephone, a handheld computer system, camcorders, CD players, or some other small computer device.

With respect to the communications link 208, the link 208 relates to any type of communications link uses to transmit data from one system to another. For instance, the systems 202 and 206 may communicate via protocols such as TCP/IP or other network and/or communication protocols, implemented over networks such as the Internet. Available communications connections and links are known in the art and need not be discussed in detail here. It will be appreciated by those skilled in the art however that transmission performance may be significantly improved when transmitting relatively smaller representations of data such that transmission of compressed code may provide a significant improvement over the transmission of uncompressed code.

In operation, the computer device 206 typically receives and stores a compressed code from the computer system 202. Upon storing the compressed code, the small computer device is not required to communicate with the computer system 202 any further. Indeed, the environment 200 shown in FIG. 2 merely illustrates a connection in order to complete the transfer of compressed code to the small computer device 206. The computer device 206 has an interpreter 210 that is used to interpret the received, compressed code. Each time the code is executed, the interpreter 210 merely accesses the stored code and interprets that code. The interpreter 210 is similar to other known interpreters, such as those used to interpret byte code or other intermediate levels of compiled code. In accordance with aspects of the present invention, however, the interpreter 210 is specifically designed to also be able to interpret compressed code, i.e., code that has been compressed in accordance with the present invention, such as by compressor 204. More particularly, the interpreter 210 directly interprets compressed code without decompression, as described below.

Although generally referred to as a byte-code interpreter, in some embodiments, interpreter 210 may perform the execution of machine level compiled code, wherein the machine level compiled code may be compressed according to the principles described herein.

Figure 3:
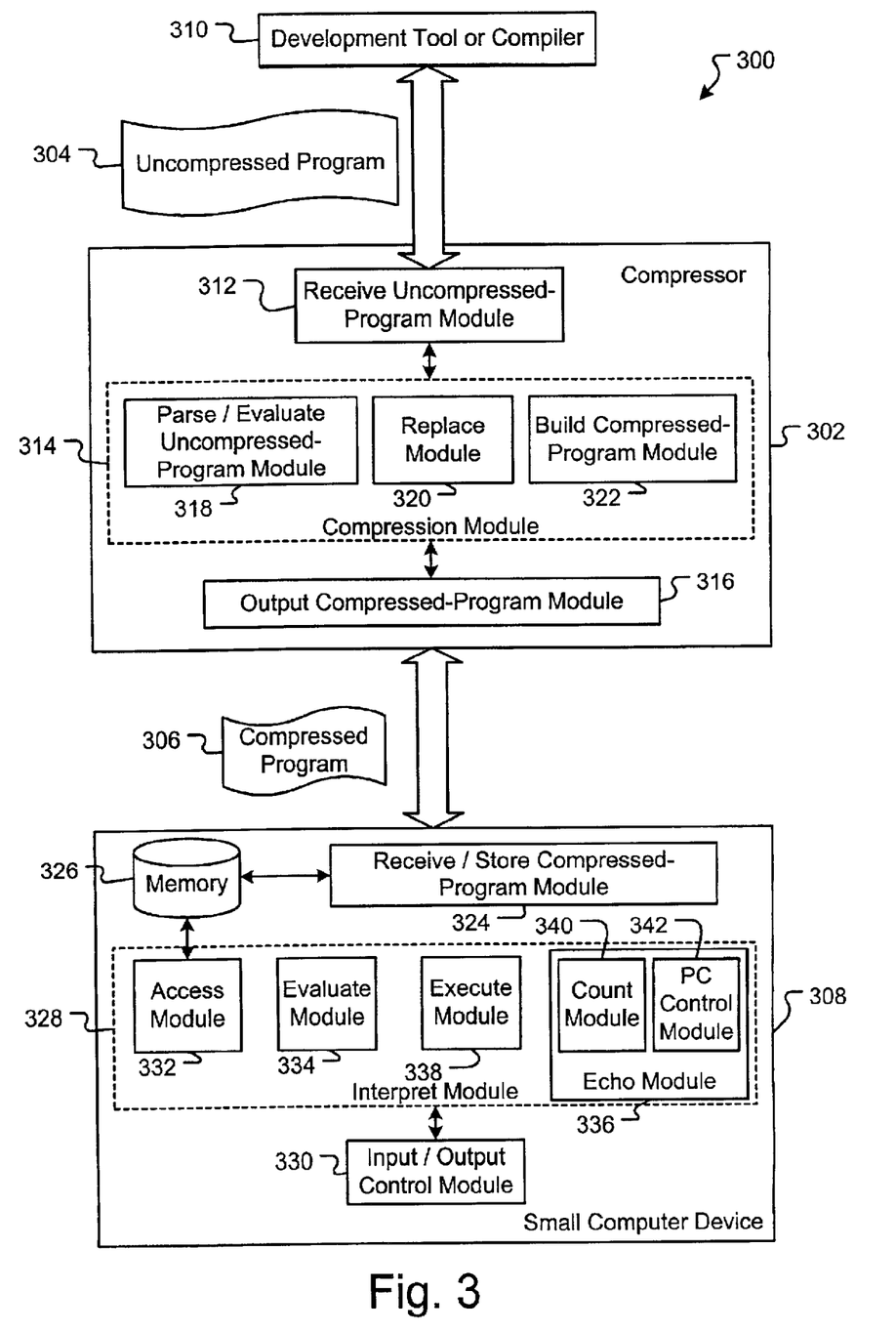
FIG. 3 illustrates a software environment in an embodiment of the present invention.

A software environment 300 that incorporates aspects of the present invention, is shown in FIG. 3. The environment 300 has a compressor module 302 that is used to compress an uncompressed portion of program code 304 and produce a compressed portion of program code 306. The compressed program code 306 is transmitted to small computer device 308, which executes the compressed program code. The environment 300 is provided as an illustrative embodiment of the functional components that may be implemented, such as in software, to carry out both the compression-phase feature of the present invention and the execution or interpretation-phase feature of the present invention. The compressor 302 represents the software components of the compressor 204 (FIG. 2). Similarly, the small computer device 308 is similar to the small computer device 206 (FIG. 2), wherein device 308 further illustrates software and other functional components that may be implemented in an embodiment of the small computer device 206.

During the compression phase of the invention, the compressor receives an uncompressed program 304. The uncompressed program 304 may originate from a development tool 310 such as a compiler. The development tool may compile a high-level language into an uncompressed byte code file.

In one embodiment, the compressor 302 has a receive module 312 that receives the uncompressed program file. The receive module may simply provide the interface functionality to accept the uncompressed file and store the uncompressed data to memory. Additionally, the receive module may further pass the uncompressed file to a compression module 314, which compresses the uncompressed program file into compressed code, such as compressed program 306. Once compressed, the compression module 314 passes the compressed program 306 to output module 316, which in turn, stores the compressed program into memory. In another embodiment, the output module 316 may also be used to transmit the compressed program 306 to other devices, such as small computer device 308.

The compression module 314 includes a parse/evaluate module 318. The parse/evaluate module is used to parse the uncompressed program file 304 and to determine whether any of the phrases located within the uncompressed program file 304 are repeated. That is, during an evaluation phase of the uncompressed program file, module 318 determines which phrases are duplicated one or more times. Upon determining that one or more instructions are duplicated, a replace module 320 is used to replace one or more of the duplicate instructions with a new instruction. The new instruction, as discussed below takes the place of one or more existing instructions and consumes less memory than the existing instructions. Also, as discussed below the replacement instruction provides information as to which instructions were replaced such that the original instructions may be executed during operation without placing a delimiter at the end of the phrase. Upon completion of the evaluation and replacement portions of the compression phase, build module 322 then builds the completed, compressed program code, such as code 306.

In an embodiment, the parse/evaluate and replace modules 318 and 320 operate in accordance with compression principles used in "LZ77" compression. LZ77 is a well-known compression algorithm, which, in general, accepts a stream of characters—typically bytes—and produces a new stream of interleaved "literals" and "pointers". Literals are the literal characters that have not been replaced. Pointers are non-literal characters that are used to point to another one or more literal characters. In essence, each pointer indicates a "phrase" or set of characters located earlier in the stream of characters. The pointer typically comprises two parts: a displacement and a length. The displacement relates to the distance back to the phrase, and the length identifies the number of characters in the phrase. For example, the byte string "Blah blah." compresses to "Blah b5,3." where the characters "Blah b" are literal characters and the underlined material denotes a pointer. In this example, the displacement is five, and the length is three, because the next three bytes repeat those back five bytes. In other embodiments, instead of a displacement value, other representations such as absolute addresses or addresses relative to a base register may be used to determine the address of a previous phase.

In the embodiment wherein the parse/evaluate and replace modules 318 and 320 use LZ77 compression principles, the parse/evaluate module 318 is used to parse the stream of instructions. The module 318 evaluates the stream for instructions that may be replaced by a pointer, i.e., an "Echo" instruction. The replace module 320 performs the act of replacing the existing or original instructions with the Echo instruction. An Echo instruction has a first parameter portion identifying the beginning of the phrase to be repeated, such as a displacement value. The Echo instruction also has a second parameter portion identifying the last instruction to be repeated, i.e., the end of the phrase to be repeated, such as a length or count value, including the proper displacement and length parameters. Upon execution, the Echo instruction provides the necessary location of both the beginning and the end of the phrase to be repeated. Stated another way, the Echo instruction identifies at least one literal instruction appearing before the Echo instruction and further identifies the number of instructions appearing before control flow returns to the point immediately after the Echo instruction.

The build module 322 encodes the compressed file in a manner that allows an interpreter to understand the difference between literals and pointers. There are many different methods of encoding a compressed file having both literals and pointers. For instance, bit masks may be used, wherein the bit masks immediately precede a set of literals and pointers and each bit in the mask provides information as to whether the following information is either a literal or a pointer. In the above compressed sequence "Blah b5,3.", the encoded bit mask might be "11111101" which indicates that the first six bytes are literals, followed by one pointer, followed by one literal (the period). More elaborate encoding techniques exist that offer multiple length or pointer sizes and thus widen the fields in the bit mask above to two or three bits. These fields are thus roughly analogous to an instruction opcode, and the length, displacement, and literal data—though separated somewhat from the mask—are roughly analogous to instruction operand fields. Build module 322 may utilize these techniques to encode literals and pointers in a manner relating to instructions in the compressed code to build code 306. Although such bit maps may be used, some embodiments do not use bit maps with directly interpretable code because the bit maps tend to put distance between the opcode and the operands. Instead the other embodiments might employ byte-code encoding to reduce the distance between the opcodes and operands.

Figure 4:
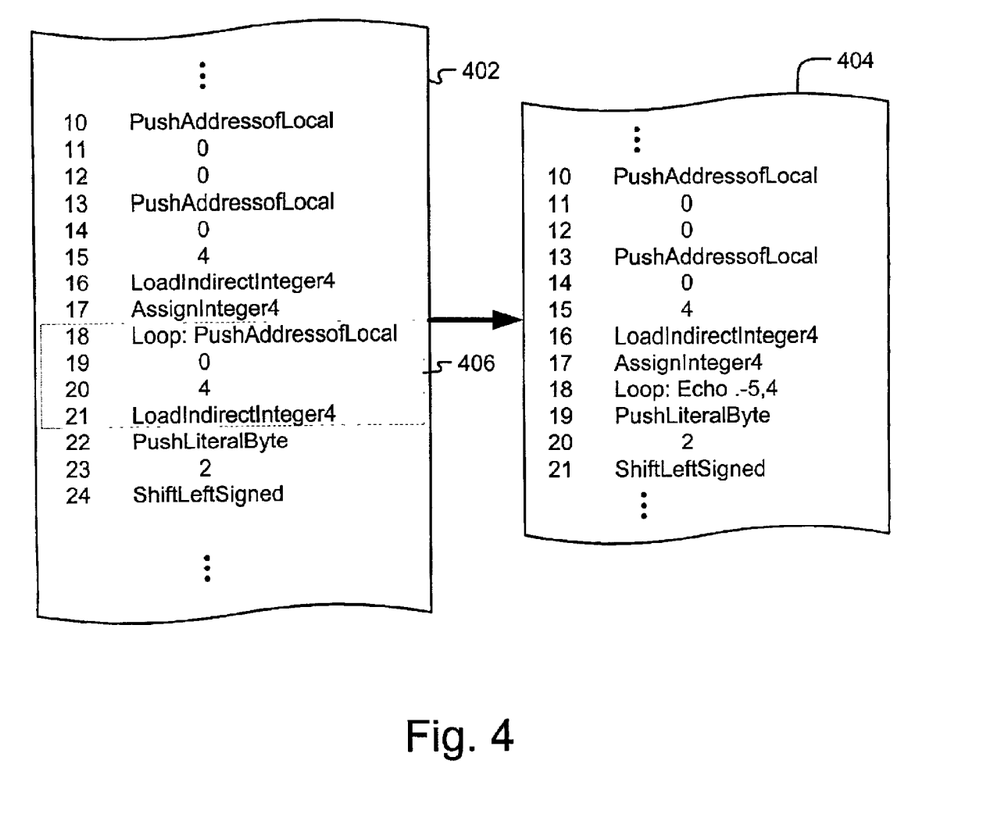
FIG. 4 illustrates an exemplary portion of program code in both an uncompressed form and a compressed form.

FIG. 4 illustrates an exemplary portion of program code in both an uncompressed form 402 and in a compressed form 404. File 402 illustrates a portion of byte-code written for the purpose of illustration. Of course, other encodings may be used but the presented example is a more readable version of instructions that may be ultimately interpreted. As shown in FIG. 4, the files 402 and 404 illustrate lines of instructions, each line having a line number (left column, as shown) for ease of reference only, and an instruction or some other addressable unit. File 402 has 15 lines of instructions or addressable units and file 404 has 12 lines of instructions or addressable units. As may be appreciated, the file 404 is a compressed version of file 402.

In particular, upon compression, lines 10–17 of file 402 remain unchanged in the compressed version 404 as lines 10–17. However, code portion 406 comprising lines 18–21 of file 402 repeat lines 13–16 of file 402 and therefore, are replaced in compressed file 404 as a new, pointer instruction "Echo", shown in line 18 in file 404. The Echo instruction has a first parameter portion identifying the beginning of the phrase to be repeated. In this case, the first parameter is a displacement parameter. The Echo instruction also has a second parameter portion identifying the last instruction to be repeated, i.e., the end of the phrase to be repeated. In this case, the second parameter is a length parameter. The displacement is 5 addressable units and the length is 2, i.e., 2 instructions. In essence, the Echo instruction at line 18 of file 404 provides an indication that the interpreter, such as interpreter 210 (FIG. 2) should go back 5 addressable units and re-execute two consecutive instructions. These Echo instructions significantly reduce the memory required to store the compressed file 404 as compared to the memory required to store file 402.

Although shown as using line numbers, the Echo instructions of other embodiments may require addresses or displacements that can generate addresses instead of line numbers. Hence the address value may be used in the parameter portion of the Echo instruction and the interpreter computes address values that can be used to adjust the program counter and execute the proper instructions. Similarly, in other embodiments, other representations for the displacement may be used, such as absolute addresses or addresses relative to a base register, which may be identified by a field in the Echo instruction.

With respect to the length parameter, the value represents the number of instructions or addressable units in the repeated phrase. Using the length parameter, the interpreter can determine when to quit interpreting repeated instructions and jump back to the next instruction, i.e., the one immediately following the Echo instruction. In the example shown in FIG. 4, the next instruction relates to line 19 of portion 404. Since the Echo instruction identifies the beginning of the repeated phrase using the first parameter, i.e., the displacement, and the end of the phrase using the second parameter, i.e., the length, the instruction itself identifies the entire repeated phrase. No other instructions, such as End Echo instructions, are needed.

It will be noted that some Echo instructions may point back to phrases that include other Echo instructions. This feature obliges the interpreter to maintain a stack of program counters and lengths, which is discussed in more detail below. In brief, as the interpreter increments the top program counter, it decrements the top length. When a length drops to zero, the interpreter pops the stack and thus resumes interpretation of the containing Echo instruction. Software interpreters may handle such stack issues without much complication. However, it is foreseen that hardware implementations might benefit from a small upper bound on the nesting level, which could be enforced by compressors, such as compressor 302, that create the Echo instructions.

Additionally, compression improves if Echo instructions can reference fragments of the streams represented by earlier Echo instructions. Consider two sequential Echo statements: "Echo .−100,4" followed by "Echo .−200,4" and assume that these two Echo instructions reference only literal instructions, not other Echo instructions. Suppose now that the program later repeats the last six of the eight base instructions identified by the two Echo instructions. This six-instruction phrase might not appear anywhere in the compressed program, because the two, four-instruction literal phrases referenced by the Echo instructions aren't adjacent. Such a program would benefit from an extended Echo instruction, which adds a field that indicates how many leading literal (that is, non-Echo) instructions to skip. For example, "Echo .—10,6,2" interprets six instructions back ten bytes, but the interpreter skips the first two instructions ultimately fetched. In this example, the ".−10" points at a piece of code, i.e., the first Echo instruction. The first Echo instruction delivers 4 instructions, which is fewer than the 6 requested, so the interpreter continues and interprets the second of the earlier Echo instructions, which delivers 4 more instructions, for a total of 8 instructions. The "2" indicates that the interpreter should skip the first 2, and the "6" indicates that all 6 of the remaining instructions should be interpreted. When it is necessary to distinguish Echo instructions with and without offset fields, the qualifiers "extended" and "basic" may be used.

Referring back to FIG. 3, once the compressed code 306 has been built, the code may be transmitted to the small computer device 308. The small computer device 308, as discussed above, receives the compressed code and executes the same. In general, the small computer device 308 has a receive/store module 324 that receives the compressed program and stores it into memory 326. Once stored, an interpret module 328 interprets the stored program code. Interpreting the code is the same as executing the code functionality using an interpreter, such as module 328. Once the compressed program is stored, the receive module 324 typically does not play a role in the interpretation phase of the program execution. However, in one embodiment, the compressed code is conducted to the small computer device in sub-parts during the execution of that code, such that the receive module operates in conjunction with the interpret module 328 to execute the program code.

During the interpretation of the code, interpret module 328 communicates with an input/output control module 330, where the input/output control module provides information used in the execution of the program code while controlling output of data or other information to output modules or devices, such as devices 116 (FIG. 1). As discussed below, the interpret module 328 interprets the compressed code directly without decompressing the code 306.

In order to interpret the compressed code, interpret module 328 has an access module 332 for accessing the code stored in memory 326 and an evaluate module 334 for evaluating accessed information to determine whether a received portion of information is either a literal instruction or a pointer, e.g., an Echo instruction. The interpret module 328 also has an Echo execution module 336 to perform the necessary control functions, such as controlling the program counter value, when an evaluated instruction is an Echo instruction that points to other instructions, e.g., literal instructions. The module 328 further includes an execute module 338 to perform or carry out literal instructions.

As may be appreciated, the access module provides the interpret module 328 with access to memory 326 and allows for the interpret module to read stored program code, such as code 306. The access module may store instructions in a program store or memory and set a program counter value to the first instruction in the program. Once accessed, evaluation module 334 parses the code, typically one instruction at a time. The evaluation module uses the program counter as a pointer to locate the next instruction to be executed. If the evaluation module determines that an instruction is a literal instruction, such as by examining the opcode associated with the instruction, the evaluation module passes the instruction to the execute module 338, which executes the instruction. The execution module may then increment the program counter to then initiate evaluation of the next instruction in the program store.

If, on the other hand, the evaluation module determines that an instruction is not a literal instruction but a pointer, e.g., an Echo instruction, then the evaluation module informs the Echo module 336 to execute the Echo instruction. In an embodiment, the Echo module 336 has a count module 340 and a program counter (PC) control module 342, which aid in the execution of an Echo instruction. The PC control module 342 saves the current program counter value to a predetermined location, such as in a temporary program counter stack (not shown), and then changes the program counter based on the displacement value or parameter indicated by the Echo instruction. Modifying the program counter in this manner initiates the fetching and execution of the referenced instruction or sequence of instructions (i.e., phrase), which appears somewhere in the program store before the Echo instruction (e.g., at a smaller address). The actual execution of the set of literal instructions is executed by the execute module 338.

The count module 340 may be implemented to determine when the program counter should be restored to previous value, i.e., the value previously stored to the program counter stack. The count module uses the length parameter, also provided with the Echo instruction, to determine the count used by the count module 340. Once the execution module 338 has executed the set of instructions, the program counter value is restored and the next instruction, that is, the instruction following the Echo instruction, is evaluated. These modules 332, 334, 336 and 338 continue to operate in this manner until all instructions in the code have been evaluated and executed.

Figure 5:
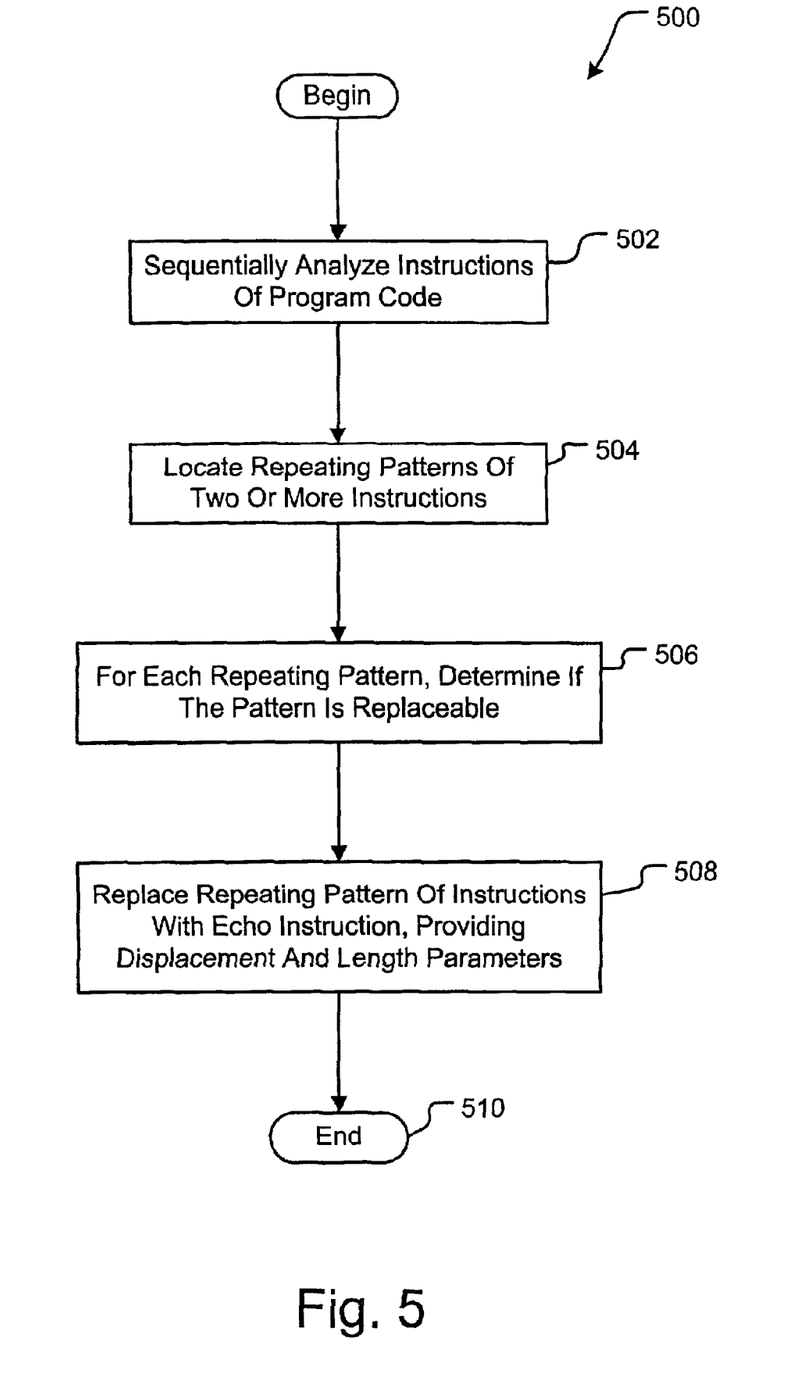
FIG. 5 illustrates a high-level flow chart of functional operations related to the compression of program code according to aspects of the present invention.

FIG. 5 illustrates the functional components related to the compression of program code according to aspects of the present invention. A compression module, such as compression module 314 shown in FIG. 3, may perform flow 500. Initially, evaluate operation 502 begins the compression process by analyzing instructions as part of an instruction stream. In an embodiment, the instructions are analyzed sequentially. That is, the instructions are traversed based on address values and not necessarily in the order in which the instructions would be executed.

Next, locate operation 504 may use the results of evaluate operation 502 to locate repeating patterns of instructions. In an embodiment, locate operation locates patterns having two or more instructions. Although the system may locate repeating, single-instruction patterns, replacing such single-instruction patterns does not necessarily compress the file by a significant amount. Of course, depending on the size of the instruction, some single-instruction patterns may still be worth replacement.

Upon locating repeating patterns of instructions, determine operation 506 determines whether the repeating patterns are replaceable. In essence, determine operation 506 implements any implementation rules regarding whether a repeating pattern should be replaced. For instance, as discussed above, decision operation 506 may determine that a single-instruction pattern should or should not be replaced depending on the size of the instruction. However, an Echo instruction can pay for even one-instruction phrases, if the original instruction includes literal bytes, and if the Echo instruction is short enough.

In another embodiment, design requirements may preclude the replacement of internal control-flow operations. For example, in an embodiment, internal control-flow operations, e.g., branch or jump operations, may not be replaced since the static instruction counts in the Echo instructions can get out of sync with the number of instructions executed dynamically. For instance, assume a program has exactly one repeated phrase or set of instructions, but the phrase includes a conditional branch over one or more instructions also within the phrase. The execution of the sole replacement instruction could take the branch and cause the loop to execute unwanted instructions past the end of the first instance of the phrase since the replacement instruction, i.e., the Echo instruction directs the execution of a predetermined number of instructions due to the length parameter.

One embodiment solves this problem by having determine operation 506 determine whether the set of repeated instructions includes internal control-flow operations and chooses to not replace such operations. Determine operation may then truncate the extension of the phrase when the next instruction is a control-flow operation.

Another repeating pattern or phrase that may not be replaced is one that includes labels. If a phrase referenced by an Echo instruction spans a label, then other instructions that cause a jump to such a label would need to skip the phrase elements before that label. In order to meet this requirement, decision operation 506 may determine not to replace such a phrase that spans a label. However, alternative embodiments may encode the jump instructions that reference the label with a field indicating the offset. Similarly, indirect jumps may require either a distinct offset field for each potential target or a restriction that all targets share a common offset.

Following determine operation 506, for each pattern that determine operation 506 determines a replacement operation is allowable, replace operation 508 replaces the pattern or phrase with an Echo instruction. The replacement operation, i.e., the Echo instruction has at least two parameters, a displacement parameter and a length parameter. The displacement parameter is related to the location of the original pattern in the instruction stream, such as the size of the block of instructions between the two phrases or potentially the number of instructions or addressable units between the two phrases. Alternatively, the displacement parameter could be presented as an absolute address, such as an address relative to a base register whose number is a field in the Echo instruction, or as any other natural representation of a previous address. The length parameter relates to the number of instructions in the pattern or phase, and in many cases, equals the number of instructions to be executed.

In another embodiment, the length equals the number of instructions or addressable units to be executed minus a value, "MIN," where MIN is the number of instructions in the shortest useful phrase. If an embodiment has some instructions that are longer than some Echo instructions, then MIN would normally be one, because an Echo instruction can usefully replace some one-instruction phrases. If an embodiment has no instructions that are shorter than the shortest Echo instructions, then MIN would normally exceed one, because there would be no advantage to substituting an Echo instruction for a singleton literal instruction given such an instruction set.

In an embodiment, during the analysis phase, repeated phrases may be identified that contain Echo instructions interleaved with other literal instructions. The phrase may be called using a subsequent Echo instruction. Consequently, the phrase containing the Echo instruction may be repeated.

Figure 6:
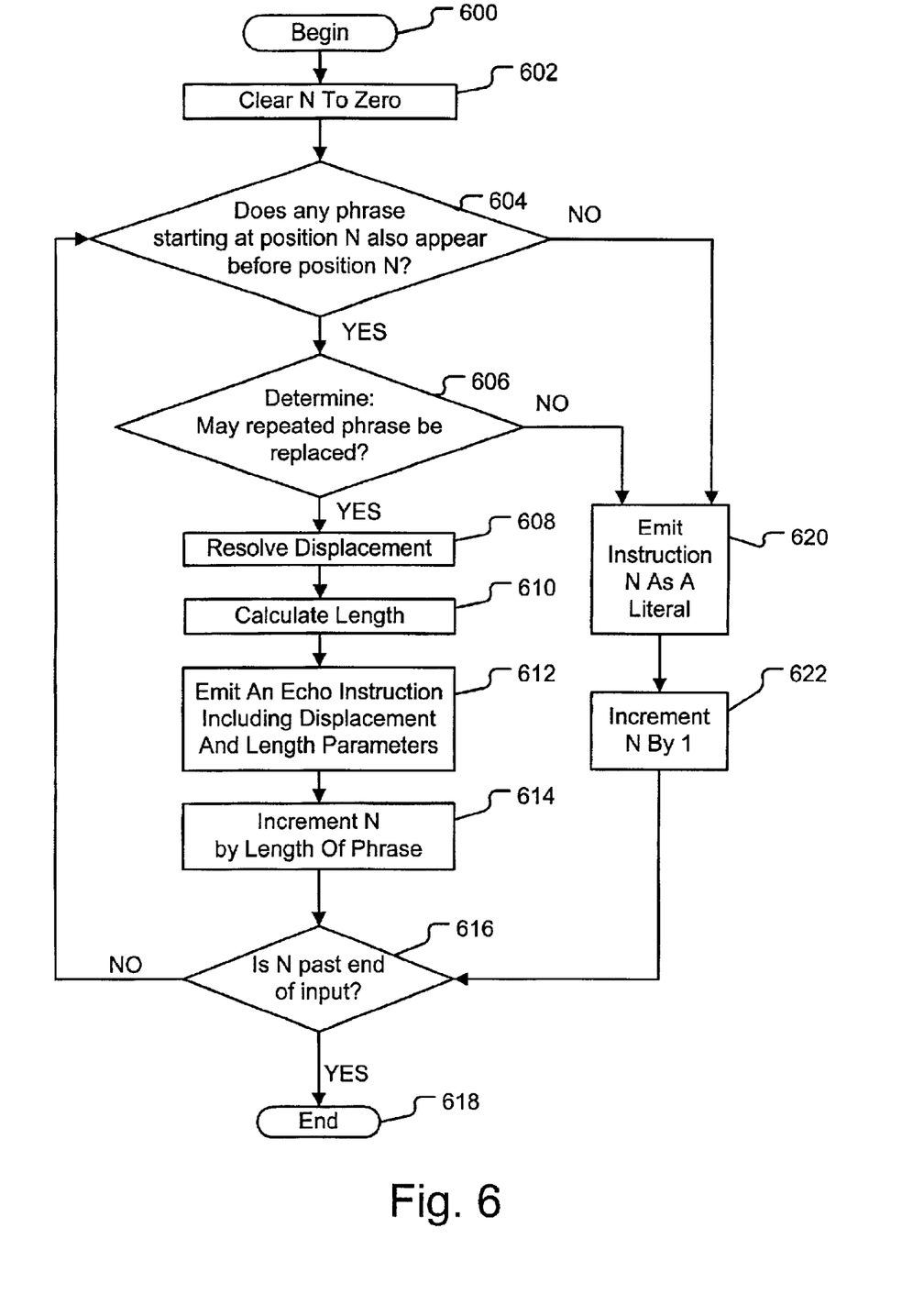
FIG. 6 illustrates a more detailed flow chart of operational characteristics of the present invention with respect to compressing program code into a directly interpretable form.

FIG. 6 illustrates the functional components related to the compression of program code according to other aspects of the present invention, wherein flow 600 is a more detailed flow of operation in an embodiment of the flow 500 shown and described above in conjunction with FIG. 5. As above, a compression module, such as compression module 314 shown in FIG. 3, may perform flow 600. The flow 600 accepts a program in a byte-code format and emits an equivalent program in which Echo instructions replace repeated phrases.

In this particular embodiment the instruction stream relates to a byte-code type instruction stream. The byte-code is a simple postfix encoding of "lcc" trees. Most of the operators in the byte-code consist of an un-typed or generic base (such as ADD) followed by a one-character type suffix (I for integer, F for float, etc), which indicates the type of value produced. Table 1 shown below lists all of the operators that appear in the byte-code. Table 1 describes the un-typed or generic operators from the initial instruction set. A superscript denotes the number of literal bytes, if any, after the operator. The type suffixes are: V for void or no value, C for char and S for short, I and U for signed and unsigned integers respectively, F and D for single- and double-precision floating-point numbers respectively, P for pointers, and B for instructions that operate on blocks of memory.

TABLE 1

Valid Byte-code Operators in one Embodiment

| Operator | Comment |
| --- | --- |
| ADD DIV SUB MUL | Arithmetic. |
| BAND BOR BXOR | Bit-wise Booleans. |
| BCOM | Bit-wise negation. |
| NEG | Arithmetic negation. |
| CVD | Convert from double. |
| CVF | Convert from float. |
| CVI | Convert from int. |
| CVI1 CVI2 | Sign-extend char, short. |
| CVU1 CVU2 | Zero-extend char, short. |
| EQ GE GT LE LT NE | Compare and push 0 or 1. |
| LSH MOD RSH | Shifts, remainder. |
| INDIR | Pop p, push *p. |
| ASGN | Pop p and v, copy v to *p. |
| ASGNB$^2$ | Pop p and v, copy the block at *v to *p. |
| ADDRF$^2$ | Push address of formal. |
| ADDRG$^2$ | Push address of global. |
| ADDRL$^2$ | Push address of local. |
| JUMP$^2$ | Pop label number, jump. |
| ARG | Top is next outgoing argument. |
| RET | Return value atop stack. |
| CALL | Pop p, call routine at address p. |
| LocalCALL$^2$ | Call routine at literal address. |
| POP | Discard top element. |
| LIT1$^1$ LIT2$^2$ LIT3$^3$ LIT4$^4$ | Push 1–4 literal bytes. |
| BrTrue | Pop flag. Jump if true. |

In this embodiment, there are 99 valid operator-suffix pairs, leaving 256−99=157 codes for use in Echo instructions. All the operators are encoded by a single byte, but a few are followed by one or more literal bytes. For example, LIT2 is followed by a two-byte constant, which is simply pushed onto the stack. Branch offsets and global addresses are not known until after compression, so they are encoded using one level of indirection. That is, the instruction stream includes not the actual address but rather a two-byte literal index into a table that holds the actual address.

The representation has two other elements, namely procedure descriptors and trampolines for inter-operation with existing libraries and conventional, non-byte-coded procedures. These elements are not byte-coded and thus not generally subject to compression with Echo instructions, so they are not described here.

Initially, flow 600 begins with the uncompressed program in the data memory of the compressor program module. A variable "N" is designated and it holds the position of the next instruction to compress. Clear operation 602 sets N to its initial value, such as zero. Following clear operation 602, compare operation 604 compares subsequent instructions with preceding instructions to determine if any phrase beginning at position N also appeared before position N.

If compare operation 604 determines that a phrase starting at the current position repeats a previous phrase, then flow branches YES from compare operation 604 to determine operation 606. Determine operation 606 determines whether the repeated phrase may be replaced with an Echo instruction. As discussed above in relation to determine operation 506 in conjunction with FIG. 5, determine operation analyzes the repeated phrase to determine if predetermined rules should be enforced, thereby preventing the replacement of the phrase, or modifying the length of the phrase that may be replaced. If determine operation 606 determines that the phrase may be replaced, then flow branches YES to resolve operation 608.

Resolve operation 608 resolves the displacement value relating to the location of the original phrase, which appears in memory somewhere before the Echo instruction, so no additional dictionary space is required.

Following resolve operation 608, calculate operation 610 calculates the length of the phrase. In an embodiment, the length of the phrase encodes the number of instructions in the phrase, perhaps reduced by MIN, which is described above.

Once the displacement value and the length value have been determined, emit operation 612 assembles and outputs a new Echo instruction having the proper parameters. Upon emitting the Echo instruction, increment operation 614 increments N to point at the first instruction after the phrase just processed. Next, compare operation 616 determines if N has been incremented past the end of the input. If so, flow branches YES to end operation 618. If not, then flow branches NO to compare operation 604 to see if the newly current instruction begins a useful phrase.

If compare operation 604 determines that a phrase starting at the current position does not repeat a previous phrase, then flow branches NO from compare operation 604 to emit operation 620. Emit operation emits the instruction at position N as a literal instruction. Similarly, if determine operation 606 determines that the repeated phrase may be not be replaced with an Echo instruction, then flow branches NO to emit operation 620 which emits the instruction as a literal instruction.

Upon emitting an instruction as a literal, increment operation 622 increments N to point at the next uncompressed instruction and then flow continues with compare operation 616. As stated above, compare operation 616 determines if N has been incremented past the end of the input. If not, then flow branches NO to compare operation 604 to see if the newly current instruction begins a useful phrase. Otherwise, flow ends at end operation 618.

In alternative embodiments, the compression method may utilize many other known techniques to improve compression results and/or speed. For instance, compression according to the present invention could adopt any of the methods used by LZ compressors, which range from linear search within the window reachable by the widest displacement, to hash tables, to "Patricia" trees. In one example, the compressor maintains a hash table that maps each instruction or each sequence of instructions to a list that holds the address of previous occurrences of said instruction or sequence. Limiting the length of such lists may reduce compression for typical programs only trivially, while improving compression time significantly.

Once compressed, flow 600 may encode the file to enable an interpreter to evaluate the various literals and pointers and execute the program. In general, adding Echo instructions to an instruction set requires choosing an encoding. One approach might use known methods such as "Tunstall" coding or "Huffman" coding which are constrained to emit codes with lengths that are multiples of eight bits. Another embodiment specifically designs the encoding scheme for the interpreter.

In an embodiment, the initial byte-code is chosen such that it has only 99 distinct operators, as discussed above. In such a case, it is possible to allocate byte-codes 128–255 to specialized Echo instructions. For example, byte-codes 128–255 might be treated as a seven-bit instruction for phrases that can be referenced with a two-bit length and a five-bit displacement. Based on various tests, it has been determined that the number of repeating phrases are generally very small in length such that a 3-bit length field could account for phrase lengths of 1–8, which may accommodate for approximately 99% of the phrases in a particular cross-section of sample programs. Additionally, a 2-bit length field may accommodate for 95% of the phrases, and a 1-bit length field could accommodate for 81%. Indeed, the tests show that even a 0-bit field—that is, an Echo instruction specialized to phrases of length 1—could handle 54% of the repeated phrases. Similarly, based on various tests, it has been determined that 1-byte displacements can capture most displacement values, but longer variations may be desired. The following table, Table 2, indicates steps that may be taken in order to optimize the encoding of Echo instructions.

TABLE 2

Encoding Test Steps

| Step | Comments |
| --- | --- |
| 1 | Use bytecodes 128–255 for Echo instructions with length of one (that is, a zero-bit length field) and a displacement that fits in seven bits. When this won't do, escape to a three-byte form, composed of a one-byte opcode plus two literal bytes that hold a three-bit length and a 13-bit displacement. |
| 2 | As above, but the one-byte encodings use a one-bit length and a six-bit displacement. |
| 3 | As above, but the one-byte encodings use a two-bit length and a five-bit displacement. |
| 4 | Use bytecodes 128–255 plus one literal byte to encode a three-bit length and a twelve-bit displacement. Use no escape codes. |

In an embodiment that includes the ability to include extended Echo instructions, i.e., Echo instructions which refer back to another Echo instruction and add an offset field that indicates where the current phrase starts in the previous phrase, special encoding may be required. In other words, since the offset field specifies the number of primitive or non-Echo instructions to skip in the earlier phrase, additional bits may be required to encode properly and efficiently the extended versions of the instruction. Based on test results, it has been determined that short offsets tend to predominate, and since zero offsets tend to outnumber the next most common offset by a factor of seven, the basic Echo instructions (that is, those with zero offsets) should keep the short two-byte encodings discussed above, and the extended Echo instructions should use a longer encoding. It has been determined that three bytes should accomplish this task, since it appears that over 99% of the non-zero offsets fit in a four-bit field. In an embodiment, opcodes 100–115 can be used to encode both the operator and the offset, and two literal bytes can encode the three-bit length and a thirteen-bit displacement.

Figure 7:
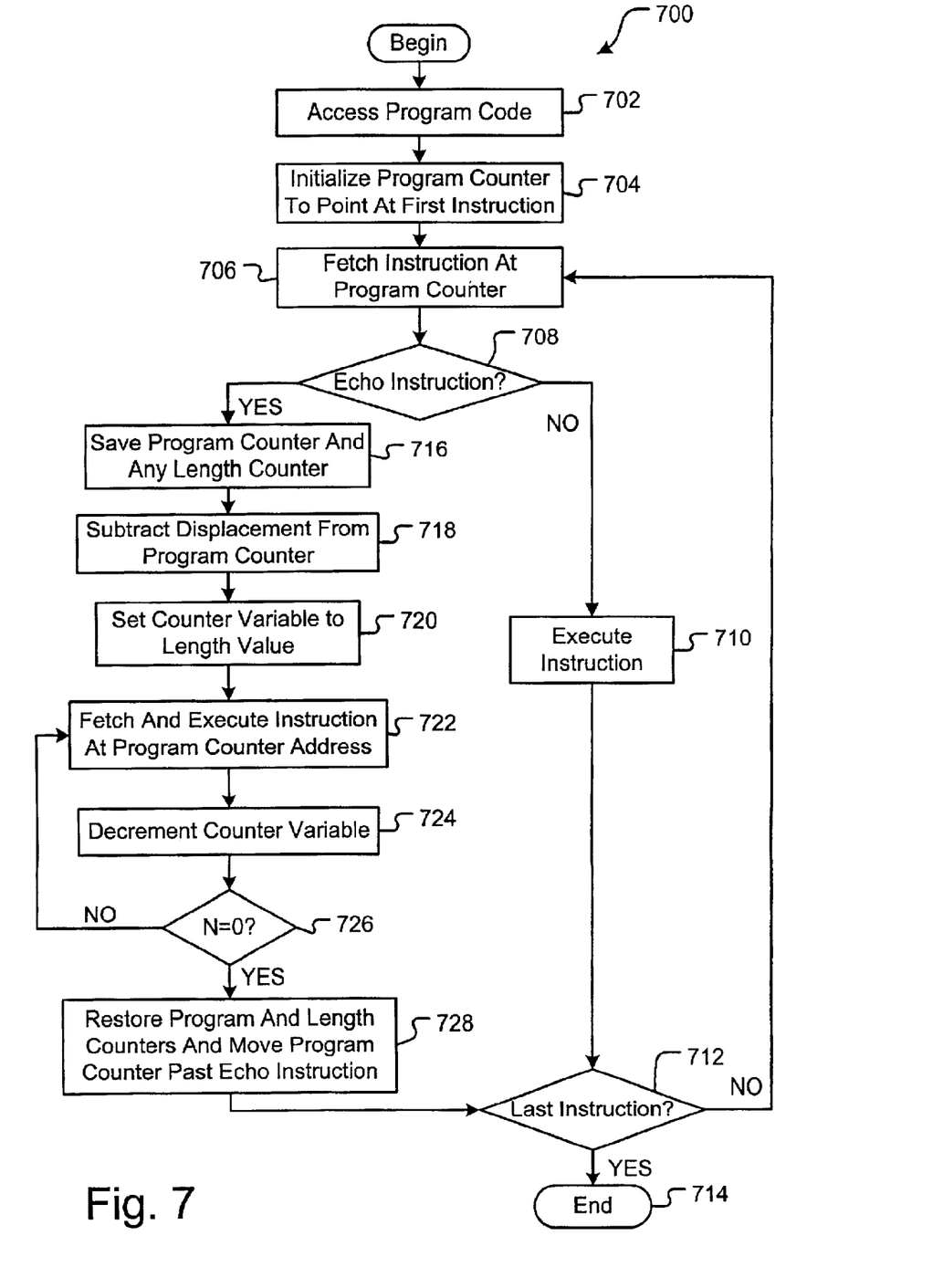
FIG. 7 illustrates a flow chart of operational characteristics relating to interpreting the compressed code in an embodiment of the present invention.

FIG. 7 illustrates the functional components related to the direct interpretation of compressed code, e.g., code that has been compressed using Echo instructions as discussed above in conjunction with FIGS. 5 and 6. The interpretation flow 700 may be performed by an interpret module, such as module 328 shown in FIG. 3.

Initially, flow 700 begins as access operation 702 accesses the compressed code, such as from memory or in combination with a receive module that communicates with a server computer system, wherein the server computer system is transmitting the compressed code to the interpret module. As stated above, in an interpretation environment, the execution may be performed through a translation/execution step that is known with respect to interpreters.

Upon execution of access operation 702, initialization operation 704 points the program counter at the first instruction in the program store. Next, fetch instruction 706 begins what is sometimes referred to as the main loop of the interpretation process. Fetch operation 706 fetches the instruction at the program counter, i.e., the memory cell addressed by the program counter. After fetching the instruction, determine operation 708 determines whether the instruction is an Echo instruction. If not, then flow branches NO to execute operation 710, which executes the instruction and updates or increments the program counter. After execution of the instruction, test operation 712 determines whether the instruction is the last one in the instruction stream. If so, flow 700 ends at end operation 714, otherwise flow branches NO back to fetch operation 706, i.e., the beginning of the main loop.

If determine operation 708 determines that the current instruction is an Echo instruction, then flow branches YES to save operation 716. Determine operation 708 may determine that the instruction is an Echo instruction by recognizing a predetermined encoded value indicating that the instruction is an Echo instruction wherein the Echo instruction provides both a displacement value and a length value.

Save operation 716 saves the program counter value and the active length counter value (if there is one) on a stack of some form. Upon saving these values, subtract operation 718 subtracts the displacement value, i.e., one of the parameters in the Echo instruction itself, from the program counter value. In this case, the displacement value equals the number of addressable units (typically but not necessarily bytes) between the Echo instruction and the first instruction in the repeated phrase.

Next, set operation 720 sets a counter variable, i.e., "N" to the length value, wherein the length value is also a parameter provided by the Echo instruction. The length value relates to the number of instructions in the repeated phrase. In an embodiment, the length value equals the number of instructions to be repeated. In another embodiment, the length value equals the number of addressable units in the repeated phrase, which may be different from the number of actual instructions in the phrase. In yet another embodiment, the length value is an address related to the last addressable unit in the phrase such that the end of the phrase is determinable from the length value. As may be appreciated, alternative identifying values maybe used as a length parameter, wherein the chosen value identifies the end of the phrase in some manner.

Once the length counter variable has been set, fetch and execute operation 722 fetches the instruction located at the value of the program counter. Since the program counter was reduced in value by the displacement value, fetch and execute operation executes an instruction that has already been stored in the program instruction store. Upon execution of the instruction, the program counter is incremented and then decrement counter operation 724 decrements counter variable value by one. Next, test operation 726 tests the counter variable N to see if it equals zero. If not, then flow branches NO back to fetch operation, which effectively fetches and executes the next instruction in the original phrase. Steps 722, 724 and 726 are repeated until the counter variable N equals zero.

If determination operation 726 determines that the counter variable N equals zero, then flow branches YES to restore operation 728. Restore operation 728 restores the program counter and any length counter to their previous values, i.e., the value stored at store operation 716. Additionally, the program counter may be incremented to move it past the Echo instruction. Upon updating the program counter, test operation 712 determines if the Echo instruction was the last instruction in the stream. If so, then flow ends at end operation 714. Otherwise, flow branches back to fetch operation 706 to fetch subsequently evaluate the next instruction. As may be appreciated, flow 700 continues until all instructions have been executed.

As may also be appreciated, Echo instructions may refer back to phrases that include other Echo instructions. In such a case, the interpreter maintains a stack of program counters and lengths. As the interpreter increments the program counter, it must decrement from the length value. When the current length, i.e., the one on top of the stack, equals zero, the interpreter pops the stack and thus resumes interpretation of the next or containing Echo instruction. As stated above, the stack is relatively straightforward to implement in software. Hardware implementations, however, may be require an upper bound on the nesting level, which could be enforced easily by compilers in creating the Echo instructions.

The pseudo-code for steps 716–728 in the flow 700 is provided in Table 3.

TABLE 3

Pseudo-Code for Interpreting Compressed Code

| Step | Pseudo-Code |
|---|---|
| 1 | Save the PC (Program Counter). |
| 2 | Subtract the contents of the Echo instruction's displacement field from the PC. |
| 3 | Set N to the contents of the Echo instruction's length field. |
| 4 | Fetch and execute the instruction at the address in the PC. |
| 5 | Decrement N and go back to Step 4 if the result exceeds zero. |
| 6 | Restore the PC and bump it past the Echo instruction. |

Implementing the above-described Echo instructions into an interpretable instruction set and the requisite Echo handling steps into a corresponding interpreter provides many benefits without significant drawbacks. For example, the above principles have been added to a pre-existing, byte-coded instruction set and only it took approximately only ten lines of C code to be added to the corresponding bytecode interpreter. Moreover, it has been shown that the above system and method may decrease code size by approximately 30%; i.e., a compression ratio of 0.70x. The current method therefore offers a useful trade-off to more complex systems.

More particularly, the above-described system and method provides a new instruction that may be used in accordance with LZ77-type compression algorithms for use inside running programs. The instruction economically references and reuses code fragments that are too small to package as conventional subroutines. The compressed code is interpreted directly, with neither prior nor on-the-fly decompression.

The implementation above invokes a fresh copy of the interpreter (with its own program counter at each call, so it is not obliged to treat calls and returns like branches and jumps and thus allows Echo instructions to reference phrases with calls and returns. Moreover, using the above method and system does not require the use of subroutine prologues and epilogues, which may be helpful in allowing reuse of phrases that are generally too small for use in subroutines. Additionally, the above system and method does not require the use of a dictionary memory or cache that stores reusable code fragments. The system and method does not require the use of end-of-phrase delimiters, such as End Echo or End-Quote instructions such that the instruction stream may be further compressed. Omitting the end-of-phrase delimiter allows for the reuse of overlapping, repeated phrases. Further still, since the program counter value is pushed on a stack upon execution of an Echo instructions, and popped from the stack at the end of the repeated phrase, nested Echo instruction are supported using the above described system and method.

Although described above in use in a software environment, the above system may be implemented in hardware. In one embodiment, the Echo instruction could be added to an emulator's internal instruction set.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer system for executing a compressed stream of instructions, the stream of instructions stored in a program store, the instruction stream having literal instructions and one or more Echo instructions for repeating one or more literal instructions, each Echo instruction relating to one or more literal instructions located in the program store, the system comprising:
    an execution module that executes literal instructions in the instruction stream;
    an evaluation module that determines whether an instruction is a literal instruction or an Echo instruction;
    an Echo module for executing the one or more Echo instructions; and
    wherein at least one Echo instruction comprises:
        a first parameter that identifies the first instruction to be repeated; and
        a second parameter that identifies the last instruction to be repeated.

2. A computer system as defined in claim 1 wherein the system further comprises a program counter used to identify instructions within the program store and wherein the Echo module further comprises:
    a program counter control module, the program counter control module controlling the value of the program counter, wherein the value of the program counter identifies the next instruction to be executed by the computer system; and
    a count module for maintaining a count of instructions to be repeated during execution of the one or more Echo instructions, the count module using the second parameter of the Echo instruction to maintain the count.

3. A computer system as defined in claim 2 wherein the program control module further stores the present value of the program counter upon execution of an Echo instruction and modifies the value of the program counter to identify a previous instruction in the program store.

4. A computer system as defined in claim 3 wherein the program control module restores the stored value of the program counter upon completion of the Echo instruction.

5. A computer system as defined in claim 4 wherein:
    the first parameter is a displacement value, the displacement value indicating a number of addressable units between the Echo instruction and a first instruction in the phrase; and
    the second parameter is a count value related to the number of instructions in the phrase.

6. A computer system as defined in claim 5 wherein, upon execution of one of the Echo commands, the displacement value is subtracted from the program counter by the program counter control module, and wherein the count value is used by the count module to indicate a number of instructions to be repeated.

7. A computer system as defined in claim 6 further comprising:
    memory;
    a receive module for receiving the compressed stream of instructions and storing the compressed stream of instructions in memory; and
    an access module for accessing the stored compressed stream of instructions.

8. A computer system as defined in claim 7 wherein the system has a restricted amount of memory and wherein the execution of the compressed instruction stream does not decompress the compressed instruction stream.

9. A computer system as defined in claim 1 wherein the compressed instruction stream is executed without decompression.

10. A computer system as defined in claim 1 wherein the instruction stream is a byte-code.

11. A method of executing a compressed instruction stream, the compressed instruction stream having one or more literal instructions and one or more Echo instructions, the method comprising:
    evaluating one of the instructions in the instruction stream to determine whether the instruction is one of the literal instructions or one of the Echo instructions, wherein each Echo instruction identifies at least one literal instruction appearing before the Echo instruction to be repeated, and wherein the Echo instruction further identifies the number of instructions appearing before the Echo instruction to be executed;
    upon determining that the evaluated instruction is one of the literal instructions, executing the literal instruction; and upon determining that the instruction is one of the Echo instructions, executing the number of previous instructions.

12. A method as defined in claim 11 wherein the instruction stream is a byte-code.

13. A method as defined in claim 11 wherein the Echo instructions comprise at least two parameters:
   a displacement value parameter associated with the first instruction to be executed, the displacement value indicating a number of intermediate addressable units between the Echo instruction and a first instruction in a repeated phrase of instructions; and
   a count value parameter identifying the number of instructions in the repeated phrase.

14. A method as defined in claim 13 wherein the act of executing one or more previously executed literal instructions further comprises:
   saving an original program counter value;
   modifying the program counter based on the displacement value; and
   performing one or more literal instructions identified by the modified program counter.

15. A method as defined in claim 14 further comprising:
   upon executing one or more instructions identified by the modified program counter, restoring the previous program counter value and any previous length counter value; and
   executing the instruction immediately following the Echo instruction.

16. A method as defined in claim 14 further comprising:
   upon executing one or more instructions identified by the modified program counter, restoring the original program counter value; and
   executing the instruction immediately following the Echo instruction.

17. A method as defined in claim 16 wherein the modification of the program counter comprises subtracting the displacement value from the original program counter value to establish a remainder and setting the program counter to the remainder.

18. A computer-readable medium having computer-executable instructions for performing the steps recited in claim 17.

19. A computer-readable medium having computer-executable instructions for performing the steps recited in claim 14.

20. A computer-readable medium having computer-executable instructions for performing the steps recited in claim 11.

21. A computer-readable medium having stored thereon a data structure, the data structure comprising:
   a compressed instruction stream of instructions executable by a computer system, the instruction stream comprising:
      one or more literal instructions;
      one or more Echo instructions, wherein the Echo instruction identifies at least one literal instruction appearing before the Echo instruction, and wherein the Echo instruction further identifies the number of instructions appearing before the Echo instruction to be executed; and
      encoding to differentiate Echo instructions from literal instructions.

22. A data structure as defined in claim 21 wherein the instruction stream may be executed without decompression.

23. A data structure as defined in claim 22 wherein the Echo instruction comprises:
   an opcode region indicating the type of operation;
   a displacement region indicating the location of a repeatable phrase; and
   a length region indicating the length of the repeatable phrase.

24. A data structure as defined in claim 23 wherein the Echo instruction further comprises an offset region indicating an offset value, the offset value relating to a number of instructions to skip during interpretation of the Echo instruction.

25. A method of compressing an instruction stream of literal instructions, the method comprising:
   sequentially evaluating the instruction stream of instructions;
   determining that one or more phrases are repeated; and
   replacing at least one instance of the one or more repeated phrases with an Echo instruction to build a compressed instruction stream, the compressed instruction stream being directly interpretable without decompression.

26. A method as defined in claim 25 further comprising encoding the instruction stream to provide means of differentiation between the literal instructions and the Echo instructions.

27. A method as defined in claim 26 further comprising:
   upon determining that a phrase is repeated, determining a displacement value relating to the distance between the first occurrence of the phrase and the second occurrence of the phrase;
   determining a length value relating to the number of instructions in the repeated phrase; and
   encoding the displacement and length values into the Echo instruction, wherein the Echo instruction replaces the second occurrence of the phrase.

28. A method as defined in claim 27 further comprising:
   upon determining that a phrase is repeated, determining whether the phrase is replaceable based on predetermined criteria; and
   wherein the phrase is replaced if determined that the phrase is replaceable.

29. A method as defined in claim 28 wherein the predetermined criteria relates to branch instructions, wherein the phrase is not replaceable if the phrase includes a branch instruction.

30. A method as defined in claim 28 wherein the predetermined criteria relates to conditional branch instructions, wherein the phrase is not replaceable if the phrase includes a conditional branch instruction.

31. A method as defined in claim 28 wherein the predetermined criteria relates to jump instructions, wherein the phrase is not replaceable if the phrase includes a jump instruction.

32. A method as defined in claim 28 wherein the predetermined criteria relates to labels, wherein the phrase is not replaceable if the phrase includes a label.

33. A method as defined in claim 28 wherein the predetermined criteria relates to labels, wherein the phrase is replaceable if the phrase includes a label, the Echo instruction replacing the phrase including the label further comprising an offset value.

34. A computer-readable medium having computer-executable instructions for performing the steps recited in claim 28.

35. A method as defined in claim 27 wherein the Echo instruction relates to another Echo instruction.

36. A computer-readable medium having computer-executable instructions for performing the steps recited in claim 25.

* * * * *